United States Patent [19]

Hasebe et al.

[11] Patent Number: 5,328,956
[45] Date of Patent: Jul. 12, 1994

[54] PROPYLENE (CO)POLYMER AND PROCESS FOR THE PREPARATION OF THE SAME

[75] Inventors: Yoshihiro Hasebe; Takayuki Amiya, both of Wakayama; Yutaka Yasuda, Osaka, all of Japan

[73] Assignee: Kao Corporation, Tokyo, Japan

[21] Appl. No.: 787,215

[22] Filed: Nov. 4, 1991

[30] Foreign Application Priority Data

Nov. 13, 1990 [JP] Japan .................. 2-307791
Dec. 28, 1990 [JP] Japan .................. 2-409124

[51] Int. Cl.$^5$ .................. C08G 63/91; C08F 236/20; C08F 8/18; C08F 4/68
[52] U.S. Cl. .................. 525/64; 525/316; 525/322; 525/332.2; 525/338; 525/355; 525/910; 526/90; 526/110; 526/124; 526/169.2; 526/173; 526/185
[58] Field of Search .................. 525/322, 316, 332.2, 525/918, 268, 272, 64, 271, 338, 355, 910; 526/90, 169, 110, 160, 124, 169.2, 173, 185

[56] References Cited

U.S. PATENT DOCUMENTS 5,037,890  8/1991  Yokoyama et al. .................. 525/322

FOREIGN PATENT DOCUMENTS 973295   8/1975  Canada .
45-40055 12/1970  Japan .
47-42385 10/1972  Japan .
62-54712 11/1987  Japan .
63-113001 5/1988  Japan .
63-113002 5/1988  Japan .

OTHER PUBLICATIONS

J. Am. Chem. Soc., 84, 1488 (1962).
Makromol. Chem. 180, (5), 1359–1361, (1979).

*Primary Examiner*—Paul R. Michl
*Assistant Examiner*—Tae H. Yoon
*Attorney, Agent, or Firm*—Birch, Stewart, Kolasch & Birch

[57] ABSTRACT

A propylene (co) polymer terminated with a reactive group and a process for the preparation of the same.

A graft copolymer having a specific side chain and a process for the preparation of the same.

The propylene (co) polymer is usable as a radial- or ion-polymerizable propylene macromonomer or as an intermediate for the preparation of a block polymer. Examples of the application thereof include compatibilizing agent for polymers, light- or laser-curable plastic, viscosity index and surface modifier.

The graft copolymer is useful as a surface modifier or compatibilizing agent for polypropylene or a dispersant for fillers.

16 Claims, No Drawings

PROPYLENE (CO)POLYMER AND PROCESS FOR THE PREPARATION OF THE SAME

BACKGROUND OF THE INVENTION

The present invention relates to a propylene (co)polymer terminated with a reactive vinyl group and a process for the preparation of the same, The present invention relates to a graft copolymer having a specific side chain and a process for the preparation of the same.

DESCRIPTION OF RELATED ART

Because polypropylene is a resin which exhibits chemically inert properties and has a simple structure, it is poor in the affinity, compatibility and reactivity with other resins or inorganic fibers, so that many efforts have been made in order to impart new functions to polypropylene without adversely affecting the properties inherent in polypropylene.

Since propylene does not exhibit radical polymerizability, unlike ethylene, the ionic copolymerization with a monomer having a protected reactive group and the modification of a polymerization catalyst have been mainly attempted in order to prepare a polymer comprising a polypropylene chain and containing a functional group.

For example, a process which comprises polymerizing an olefin in the presence of an anionic coordination polymerization catalyst and radical-copolymerizing the obtained olefin polymer with a vinyl compound starting with its terminal was proposed in Japanese Patent Publication Nos. 40055/1970 and 42385/1972 as a process for copolymerizing propylene with a vinyl monomer having an unprotected functional group. This process, however, tends to form a homopolymer of a vinyl compound as a by-product, resulting in a very low yield of an objective copolymer. Further, it was reported in Japanese Patent Publication No. 54712/1987 that a graft copolymer comprising a propylene polymer and a styrene polymer grafted thereonto can be prepared by lithiating a polypropylene and adding styrene to the lithiated polypropylene. However, this process is conducted in a heterogeneous system in many cases and according to the process, the molecular design of an objective copolymer is severely limited and the presence of a homopolymer formed as a by-product is unnegligible.

On the other hand, a process using a Ziegler-Natta catalyst can give a crystalline propylene polymer having a high degree of polymerization, but the synthesis of a partially (terminally) modified propylene polymer by the process is believed to be difficult because the terminal of the propylene polymer exists a state of polymerizable only a short time. Therefore, it has been thought that it is difficult to synthesize a propylene polymer containing a functional group from the resulting propylene polymer by the process using a Ziegler-Natta catalyst.

Meanwhile, it has been found by Natta et al. that a catalyst system prepared by the reaction of a vanadium chelate compound with an alkylaluminum chloride gives a high activity to the polymerization of propylene [see J. Am. Chem. Soc., 84, 1488 (1962)]. Further, Doi, Soga et al. have found that when propylene is polymerized in the presence of this catalyst system at low temperature, the reaction proceeds in the manner of living polymerization [see Makromol. Chem., 180 (5), 1359 (1979)].

Furthermore, it has been known that catalyst systems prepared by the reaction of vanadium with various chelate compounds as well as the above catalyst system can attain living polymerization and a series of polypropylenes which are rich in syndiotactic chains and are terminally modified can be prepared by the use of these catalyst systems.

For example, Japanese Patent Laid-Open No. 113001/1988 discloses that a polypropylene terminally modified with a vinyl group can be prepared by adding a conjugated or non-conjugated diolefin compound to the living polymerization system of propylene. According to this modification, however, only a vinyl group bonded to an aliphatic group can be bonded to the terminal of polypropylene and the terminal vinyl group thus introduced is poor in polymerizability. Therefore, the use of the resulting polypropylene terminally modified with a vinyl group is limited to substitution and addition reactions and the application thereof as a macromonomer for vinyl polymerization is difficult.

Further, Japanese Patent Laid-Open No. 113002/1988 discloses that a polypropylene modified with an (alkyl-substituted) phenyl group at its terminal can be prepared by adding an (alkyl-substituted) styrene to a living polymerization system of propylene to conduct a reaction. However, no reactive group can be introduced into the resulting modified polypropylene unless the substituted benzyl group introduced thereinto as a terminal group is further treated by, e.g., modification.

Further, there have been attempted the synthesis of a block copolymer of a polymeric initiator type comprising a polypropylene terminated with an initiating group and a process which comprises metallizing a polypropylene at random and grafting a vinyl copolymer thereonto to form a side chain. However, these techniques are still unsatisfactory.

The object of the present invention is to provide a syndictactic propylene (co)polymer which is modified with a polymerizable styrenic vinyl group at only one terminal thereof, has a nearly monodisperse molecular weight and is soluble in various solvents and to provide a process for preparing thereof.

In the terminal modification by the living polymerization of propylene according to the prior art, a conjugated or non-conjugated diolefin or an alkyl-substituted styrene is added to the living polymerization system of polypropylene and the residual terminal group is poor in reactivity, while no modification of polypropylene with a highly polymerizable group such as a styryl group has been made.

The another object of the present invention is to provide a graft copolymer having a specified side chain and to provide a process for preparing thereof.

SUMMARY OF THE INVENTION

The inventors of the present invention have intensively studied to solve the problems above-mentioned and have found that a propylene (co)polymer terminated with a vinyl group polymerizable by radical, anionic or cationic polymerization mechanism can be prepared by reacting a propylene (co)polymer having a polymerizable terminal prepared by the above-mentioned process with an aromatic divinyl compound. The present invention has been accomplished on the basis of this finding.

Namely, the present invention provides a propylene (co)polymer having a polymerizable group represented by the following general formula (I):

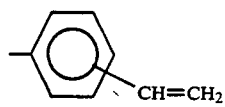
(I)

at one terminal thereof.

Among the propylene (co)polymers according to the present invention, those represented by the following general formula (II) are particularly preferable:

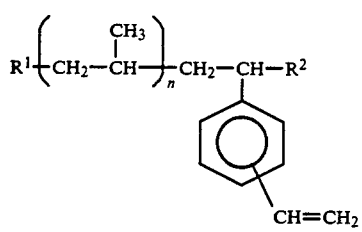
(II)

wherein
$R^1$ represents a hydrogen atom or a hydrocarbyl group having 1 to 3 carbon atoms;
$R^2$ represents for a hydrogen atom or a halogen atom;
n is 10 to 10,000; and
the relative position of the $-CH=CH_2$ substituent on the benzene ring may be any of the o-, m- and p-positions.

The propylene (co)polymer having a polymerizable group represented by the general formula (I) according to the present invention can be prepared by a process comprising steps:

(a) (co)polymerizing propylene in the presence of a polymerization catalyst comprising a catalyst component(x) containing a vanadium compound represented by the following general formula (III):

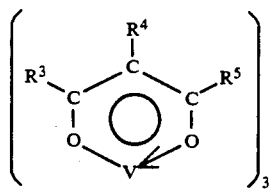
(III)

wherein $R^3$ to $R^5$ each represents a hydrogen atom or a hydrocarbyl group having 1 to 8 carbon atoms, except a case wherein the three groups are simultaneously hydrogen atoms, and an organometallic compound (y) having a metal of a Group I, II or III of the periodic table to form a propylene (co)-polymer having a reactive terminal;

(b) reacting the propylene (co)polymer having a reactive terminal with an aromatic divinyl compound represented by the following general formula (IV):

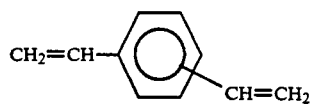
(IV)

wherein the relative position of the two substituents on the benzene ring may be any of the o-, m- and p-positions; and (c) reacting a resulting propylene (co)polymer with a proton donor or a halogen molecule.

Further, the inventors of the present invention have made studies on the preparation of a graft copolymer comprising a polypropylene portion and a vinyl group by a macromonomer process. As a result they have found a novel polypropylene macromonomer terminated with a polymerizable vinyl group and a fact that a graft copolymer having a polypropylene side chain can be prepared by copolymerizing this macromonomer with a vinyl compound copolymerizable therewith. The present invention has been accomplished on the basis of these findings.

Namely, the present invention provides a graft copolymer having a main chain originated from a vinyl compound and a side chain originated from the propylene (co)polymer having a polymerizable group represented by the following general formula (I):

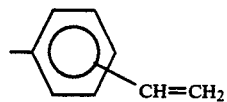
(I)

at one terminal thereof.

Preferably, the side chain originated from the propylene (co)polymer has a chemical constitution represented by the general formula (V):

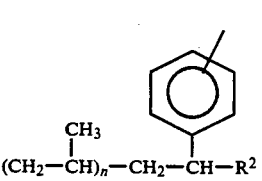
(V)

wherein
$R^1$ represents a hydrogen atom or a hydrocarbyl group having 1 to 3 carbon atom(s);
$R^2$ represents a hydrogen atom or a halogen atom;
n is 10 to 10,000;and
the relative position of the substituents on the benzene ring may be any of the o-, m- and p-positions.

The graft copolymer according to the present invention can be prepared by a process comprising a step of copolymerizing the propylene (co)polymer having a polymerizable group represented by the above general formula (I) at one terminal thereof with a vinyl compound copolymerizable therewith.

Preferably the graft copolymer according to the present invention can be prepared by a process comprising a step of copolymerizing the propylene (co)polymer represented by the above general formula (II) according to the present invention with a vinyl compound copolymerizable therewith.

DETAILED DESCRIPTION OF THE INVENTION

The present invention will now be described in more detail.

Polymerization Catalyst

The polymerization catalyst to be used in the present invention comprises a catalyst component (x) containing a vanadium compound represented by the above general formula (III) and an organometallic compound (y) having a metal of a Group I, II or III of the periodic table.

Among the vanadium compounds represented by the above general formula (III), the following compounds A, B and C are particularly desirable:

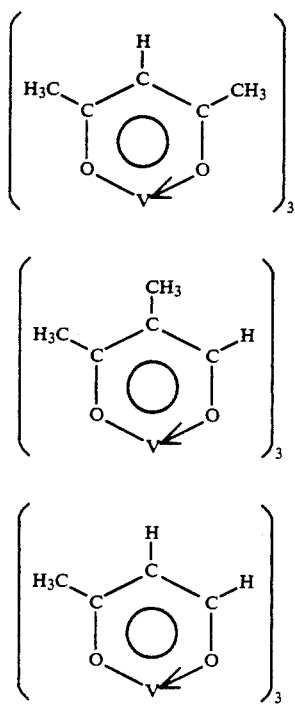

A solid catalyst component prepared by supporting such a vanadium compound on a metal oxide such as silica may be used as a catalyst component (x) in the present invention. Such a solid catalyst component can be prepared by reacting silica with a halogenated silicon compound such as chloromethylphenethyltrichlorosilane and reacting the obtained solid product with an organic alkali metal compound such as sodium 1,3-butanedionate and then with a vanadium compound.

The organometallic compound (y) to be used together with the component (x) includes organometallic compounds having lithium, magnesium, calcium, zinc or aluminum, among which organoaluminum compounds represented by the general formula: $R_2AlX$ (wherein R represents for an alkyl group or an aryl group having 1 to 8 carbon atoms and X represents a halogen atom) such as dimethylaluminum chloride, diethylaluminum chloride, diethylaluminum bromide and diisobutylaluminum chloride are particularly desirable.

Process for the Preparation of Living Propylene (Co)Polymer

A living propylene (co)polymer can be prepared by polymerizing propylene in the presence of the above-mentioned polymerization catalyst. The polymerization may be conducted also in the presence of a small amount of other α-olefin such as ethylene, 1-buterie, 1-hexene or 4-methyl-1-pentene to obtain a propylene-type copolymer.

The polymerization is desirably conducted in a solvent which is inert to the polymerization and liquid during the polymerization. Examples of such a solvent include saturated aliphatic hydrocarbons such as propane, butane, pentane, hexane and heptane; saturated alicyclic hydrocarbons such as cyclopropane and cyclohexane; and aromatic hydrocarbons such as benzene, toluene and xylene.

With respect to the amount of the polymerization catalyst to be used in the polymerization, the vanadium compound (a catalyst component (X)) is used in an amount of $1 \times 10^{-4}$ to 0.1 mol, desirably $5 \times 10^{-4}$ to $5 \times 10^{-2}$ mol per mole of propylene or a mixture of propylene with other comonomer and the organometallic compound (y) is used in an amount of $1 \times 10^{-3}$ to 1 mol, desirably $5 \times 10^{-3}$ to 0.1 mol per mole thereof. Further, the organometallic compound (y) is desirably used in an amount of 5 to 25 mol per mole of the vanadium compound.

The living polymerization is generally conducted at $-100°$ to $0°$ C. for 0.5 to 50 hours. The molecular weight and yield of the living propylene (co)polymer can be controlled by suitably selecting the reaction temperature and reaction time as well as the amount of the polymerization catalyst used. When the polymerization temperature is low, particularly $-30°$ C. or below, a polymer having a nearly monodisperse molecular weight distribution can be obtained. When it is $-65°$ C. or below, a living polymer having an Mw (weight-average molecular weight) to Mn (number-average molecular weight) ratio of 1.05 to 1.40 can be obtained.

In the polymerization, anisole, water, oxygen, alcohol (such as methanol, ethanol or isopropanol) or ester (such as benzoate or ethyl acetate) may be used as a reaction accelerator. The amount of the accelerator used is generally 0.1 to 2 mol per mole of the vanadium compound.

A nearly monodisperse living propylene (co)polymer having a number average molecular weight of about 500 to 400,000 can be prepared by the process described above.

Reaction with Aromatic Divinyl Compound

The aromatic divinyl compound to be reacted with the living propylene (co)polymer is one represented by the above general formula (iV).

The above general formula (ZV) represents a conjugated aromatic divinyl compound, i.e., o-, m- or p-divinylbenzene.

The reaction of a living propylene (co)polymer with an aromatic divinyl compound is desirably conducted by adding an aromatic divinyl compound to the reaction system prepared in the foregoing step in which a living propylene (co)polymer is contained. The reaction may be conducted at $-100°$ to $0°$ C. for 5 minutes to 10 hours, preferably at the same temperature as that of the above living polymerization of propylene.

The aromatic divinyl compound is used in an amount of 1 to 1,000 mol, preferably 1 to 20 mole per mole of the living propylene (co)polymer.

According to the present invention, it is conceivable that after the living propylene (co)polymer has been added to one vinyl group of divinylbenzene, the reactivity of the other vinyl group for an anion might be remarkably lowered owing to the delocalization of the resulting anion to thereby attain the bonding of a highly reactive vinyl group to the terminal of the (co)polymer.

Reaction with Proton Donor or Halogen Molecule

The living propylene (co)polymer is reacted with an aromatic divinyl compound and then brought into contact with a proton donor or a halogen molecule to give a propylene (co)polymer terminated with a polymerizable group according to the present invention.

The proton donor includes alcohols such as methanol and ethanol and mineral acids such as hydrochloric and sulfuric acids, while the halogen molecule includes iodine and chlorine. The amount of the proton donor or the halogen molecule to be used is 10 to 10,000 times by mole, preferably 100 to 1,000 times by mole, as much as the organometallic compound (y) used. The contact of the above-mentioned living propylene (co)polymer having one vinyl group with a proton donor or a halogen molecule is generally conducted at $-100°$ to $+100°$ C. for one minute to 10 hours.

By these, a styrylated propylene (co)polymer as the propylene (co)polymer terminated with a specified reactive group according to the present invention is obtained.

The graft copolymer of the present invention can be prepared by copolymerizing a styrylated propylene (co)polymer as prepared by the above process with a vinyl compound copolymerizable therewith according to a radical, anionic or cationic polymerization process.

Process for the Preparation of Graft Copolymer by Radical Polymerization

First, the preparation of a graft copolymer by radical polymerization is described.

The radical polymerization initiators to be used when the graft copolymer of the present invention is prepared by a radical polymerization process include those described in "Rajikaru Jugo (Radical Polymerization) (I)", pp. 27 to 57, published by Kagaku Dojin (1971). Particular examples thereof include hydroperoxides such as cumene hydroperoxide and tert-butyl hydroperoxide; dialkyl peroxides such as dicumyl peroxide and di-tert-butyl peroxide; ketone peroxides such as methyl ethyl ketone peroxida and cyclohexanone peroxide; diacyl peroxides such as lauroyl peroxide, acetyl peroxide and benzoyl peroxide; alkyl peroxyesters such as tert-butyl peroxybenzoate; and azo compounds such as 2,2'-azobisisobutyronitrile and 1,1'-azobiscyclohexan-1-carbonitrile. The radical polymerization initiator to be used may be suitably selected among these compounds depending upon the preparation process or the kind of the monomer used.

The vinyl compound to be used in the radical polymerization may be any one copolymerizable with the styrylated propylene polymer by the use of a radical polymerization catalyst and includes those described in the "Rajikaru Jugo (Radical Polymerization) (I)", pp. 5 to 9, published by Kagaku Dojin (1971). Particular examples thereof include acrylic derivatives such as methacrylic and acrylic acids, alkyl acrylates, alkyl methacrylates, acrylonitrile, methacrylonitrile, acrylamide and methacrylamide; styrene derivatives such as styrene, α-methylstyrene and chlorostyrene; vinyl esters such as vinyl acetate; halogenated vinyl compounds such as vinyl chloride and vinylidene chloride; vinylpyridine and vinylpyrolidone; and dienes such as butadiene and isoprene.

When the graft copolymer of the present invention is prepared by a radical polymerization process, a preferable process comprises making a styrylated propylene (co)polymer dissolve or swell in an inert solvent and adding a vinyl compound as described above to the obtained system to conduct polymerization, though a conventional process may be employed.

Although the radical polymerization can be carried out in the presence or absence of a solvent, it is preferable to use a solvent in which a styrylated propylene (co)polymer can dissolve or swell. Examples of such a solvent include aliphatic hydrocarbons such as pentane, hexane, heptane and octane; alicyclic hydrocarbons such as cyclopentane and methylcyclohexane; and aromatic hydrocarbons such as benzene, toluene and xylene. It is preferable that the polymerization temperature be selected so that the radical polymerization initiator used can be decomposed with a half-life of one minute to 100 hours. When no radical polymerization initiator is used, the polymerization temperature is preferably 100° to 300° C.

The radical polymerization time may be 0.1 hour or above, though not particularly limited. Generally, an objective graft copolymer comprising a portion originated from a styrylated propylene (co)polymer and a portion originated from a vinyl compound can be prepared with a reaction time of 1 to 24 hours.

Process for the Preparation of Graft Copolymer by Anionic Polymerization

The anionic polymerization initiator to be used when the graft copolymer of the present invention is prepared by an anionic polymerization process includes those described in "Anion Jugo (Anionic Polymerization)", pp. 7 to 24, published by Kagaku Dojin (1971). Particular examples thereof include alkali metals such as lithium and sodium; alkali metal derivatives of aromatic compounds such as sodium naphthalene; alkali metal alkyl compounds such as n-butyllithium and sec-butyllithium; and alkali amides such as dialkyllithium amide.

The vinyl compound to be used in the anionic copolymerization may be any one copolyerizable with the styrylated propylene (co)polymer by the use of an anionic polymerization catalyst and include those described in the "Anion Jugo (Anionic Polymerization)", pp. 7 to 24, published by Kagaku Dojin (1971). Particular examples thereof include hydrocarbon monomers such as α-methylstyrene, styrene, butadiene and isoprene; and polar monomers such as methyl methacrylate, methyl acrylate, methyl vinyl ketone, acrylonitrile, acrylamide, nitroethylene, methylenemalonate, ethyl cyanoacrylate, vinylidene cyanide and vinylpyridine.

Although the copolymerization temperature may be selected in a range wherein the anionic polymerization initiator used is effective, it is preferably $-150°$ to $100°$ C.

The solvent to be used in the anionic polymerization may be any one in which a styrylated propylene (co)-polymer can dissolve or swell and examples of such a solvent include aliphatic hydrocarbons such as pentane, hexane, heptane and octane; alicyclic hydrocarbons such as cyclopentane and methylcyclohxane; and aromatic hydrocarbons such as benzene, toluene and xylene.

The anionic polymerization time may be 0.1 hour or above, though not particularly limited. Generally, an objective graft copolymer comprising a portion originated from a styrylated propylene (co)polymer and a portion originated from a vinyl compound can be obtained with a reaction time of 1 to 24 hours.

Process for the Preparation of Graft Copolymer by Cationic Polymerization

The cationic polymerization initiator to be used when the graft copolymer of the present invention is prepared by a cationic polymerization process includes those described in "Kachion Jugo (Cationic Polymerization)", pp. 9 to 61, published by Kagaku Dojin (1971). Particular examples thereof include protonic acids such as sulfuric and hydrochloric acids; metal oxides such as $CrO_3$ and silica-alumina; halogen molecules such as iodine and bromine; metal halides such as aluminum chloride and titanium tetrachloride; organometallic compounds such as ethylaluminum dichloride and diethylaluminum chloride; and carbonium Ion salts such as $(C_6H_5)_3CSnCl_5$.

The vinyl compound to be used in the cationic copolymerization may be any one copolymerizable with the styrylated propylene (co)polymer by the use of a cationic polymerization catalyst and includes those described in the "Kachion Jugo (Cationic Polymerization)" pp. 4 to 6, published by Kagaku Dojin (1971). Particular examples thereof include vinyl ethers and their derivatives such as ethyl vinyl ether and isopropyl vinyl ether; N-vinylcarbazole; indene; isobutenic monomers; styrenic monomers such as styrene and halogenated styrenes; and conjugated diene monomers such as butadiene and pentadiene.

The solvent to be used in the cationic polymerization is any one in which a styrylated propylene (co)polymer can dissolve or swell and examples of such a solvent include aliphatic hydrocarbons such as pentane, hexane, heptane and octane; alicyclic hydrocarbons such as cyclopentane and methylcyclohexane; and aromatic hydrocarbons such as benzene, toluene and xylene.

Although the cationic polymerization temperature may be selected in a range wherein the cationic polymerization initiator used is effective, it is preferably −150° to 100° C. The reaction time may be 0.1 hour or above, though not particularly limited. Generally, an objective graft copolymer comprising a portion originated from a styrylated propylene (co)polymer and a portion originated from a vinyl compound can be obtained with a reaction time of 1 to 24 hours.

The graft copolymer prepared by the process as described above is isolated and purified as follows. That is, the graft copolymer can be isolated by a known method such as the solvent removal by distillation or the reprecipitation from a non-solvent.

It can be ascertained by a conventional method that the graft copolymer prepared above is a graft copolymer comprising a polyalkylene, mainly polypropylene, portion and a polymer portion originated from a vinyl compound. For example, it can be ascertained by a fact that when the obtained graft copolymer is dissolved in a good solvent for both the polyalkylene such as polypropylene and the polymer originated from a vinyl compound and reprecipitated from a poor solvent for only one of them, no change was observed in the weight of the obtained graft copolymer before and after the reprecipitation.

Effect of the Invention

Since the propylene (co)polymer terminated with a specified reactive group according to the present invention is prepared through living polymerization, it has a very narrow molecular weight distribution (i.e., an Mw to Mn ratio of 1.05 to 1.40). Further, the propylene (co)polymer is terminated with a styrenic vinyl group highly reactive to addition or polymerization.

Accordingly, the propylene (co)polymer according to the present invention is usable as a radical- or ion-polymerizable propylene-type macromonomer or as an intermediate for the preparation of a block copolymer utilizing the vinyl group or for the preparation of a modified propylene (co)polymer having a functional group formed by modification of the vinyl group. Examples of the application thereof include compatibilizing agent for polymers, light- or laser-curable plastic, viscosity index improver and surface modifier.

According to the present invention, a graft copolymer having a main chain originated from a vinyl compound and a side chain originated from the propylene (co)polymer having a specified polymerizable group can be prepared. The process of the preparing the graft copolymer according to the present invention can be applied to more kinds of vinyl compounds than that of the process according to the prior art. Further, according to the present invention, the content of a portion originated from a vinyl compound in the graft copolymer can be controlled by suitably selecting the feed ratio of the starting materials or the polymerization time.

Since the graft copolymer of the present invention includes at least two polymer components different in properties, it exhibits new functions with the excellent characteristics inherent in the polypropylene being retained. The graft copolymer of the present invention is useful as, for example, a surface modifier or compatibilizing agent for polypropylene or a dispersant for fillers.

EXAMPLE

The present invention will now be described in more detail by referring to Examples, though the present invention is not limited to them.

EXAMPLE 1

Living Polymerization of Propylene 200 ml of toluene was put in a 1000-ml flask sufficiently purged with nitrogen gas and cooled to −78° C. 12.6 g (300 mmol) of propylene was added to the flask at that temperature to form a solution of propylene in toluene. A solution of 6.25 ml (50 mmol) of $Al(C_2H_5)_2Cl$ and 1.75 g (5.0 mmol) of vanadium acetylacetonate in 30 ml of toluene was added to the flask. The contents were stirred at −78° C. for one hour to conduct polymerization.

Reaction with Aromatic Divinyl Compound 2.9 ml (20 mmol) of m-divinylbenzene was added to the above reaction system and the resulting mixture was stirred at −78° C. for 30 minutes.

Isolation and Purification of Polymer

The above reaction system was brought into contact with 1000 ml of methanol to stop the polymerization and the obtained polymer was washed with 1000 ml of methanol at ordinary temperatures three times and dried at ordinary temperatures under a reduced pressure (yield: 2.5 g).

It was ascertained that the obtained polymer contained neither component soluble in ethyl acetate nor gel, which revealed that neither homopolymer of divinylbenzene nor crosslinked polymer was formed.

The polymer was soluble in toluene, cyclohexane and hexane and an absorption near 1600 cm$^{-1}$ assignable to the phenyl group was observed.

The molecular weight (Mn) of the polymer was 3500 as determined by GPC analysis (in terms of polystyrene) (Mw/Mn=1.2).

Further, in the $^1$H-NMR analysis of the polymer in heavy cyclohexane solvent, not only methyl, methylene and methyne signals (skeleton proton signals of polypropylene) at δ of 0.7 to 1.7 ppm but also a signal at δ of 7.2 ppm assignable to the proton of the benzene ring and signals at δ of near 6.7, 5.7 and 5.2 assignable to the vinyl group (styrenic vinyl group) were observed.

The comparison of the area of the proton signal of the polypropylene moiety with that of the proton signal of the benzene ring or that of the proton signal of the vinyl group revealed that the benzene ring and the vinyl group are present in equimolar amounts and the molecular weight (Mn) of the polymer was 3200 as calculated based on the ratio of the benzene ring to the polypropylene moiety. The molecular weight thus calculated is nearly equal to that determined by GPC, i.e., 3500 (Mn). Accordingly, it was ascertained that the obtained polymer was a propylene polymer having one styryl group at one terminal thereof, that is a styrylated propylene polymer, represented by the following formula:

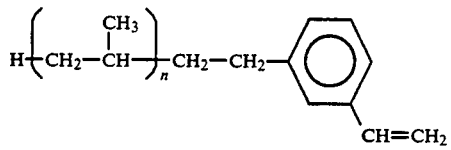

(wherein n is 76 on the average).

EXAMPLE 2

Propylene was living-polymerized in a similar manner to that of the Example 1 except that 25.2 g (600 mmol) of propylene was used and that the polymerization time was changed to 3 hours. The obtained system was treated in a similar manner to that of Example 1 to give a polymer (yield: 5.0 g).

The obtained polymer had a number-average molecular weight (Mn) of 25,000 and an Mw to Mn ratio of 1.3 as determined by GPC and it was ascertained that the polymer was a propylene polymer represented by the following formula:

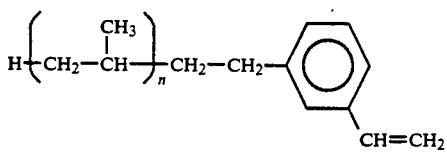

(wherein n is 590 on the average).

EXAMPLE 3

The reaction was conducted in a similar manner to that of the Example 1 except that 25. 2 g (600 mmol) of propylene was used, that the polymerization time was changed to 3 hours and that the aromatic divinyl compound to be bonded to the terminal of living polypropylene was p-divinylbenzene. The obtained system was treated in a similar manner to that of the Example 1 to give a polymer (yield: 5.0 g).

The obtained polymer had a number-average molecular weight (Mn) of 26,000 and an Mw to Mn ratio of 1.3 (as determined by GPC) and it was ascertained that the polymer was a propylene polymer represented by the following formula:

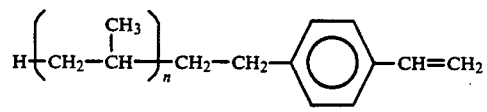

(wherein n is 620 on the average).

EXAMPLE 4

Radical Copolymerization of Styrylated Propylene Polymer with Styrene 200 ml of dry toluene as a solvent, 5 g of the styrylated propylene polymer prepared in the Example 1 and 5 g of styrene as a vinyl compound were fed into a 500-ml three-necked separable flask fitted with a balloon and a three-way cock in a nitrogen atmosphere. The contents were stirred with a magnetic stirrer for 10 hours in the presence of 0.5 g of azobisisobutyronitrile (AIBN) as an initiator at 50° C. to conduct polymerization.

After the completion of the reaction, the reaction mixture was poured into excess methanol to form a precipitate. This precipitate was subjected twice to reprecipitation procedure comprising dissolving it in toluene and dropping the obtained solution into methanol to form a precipitate again. The resulting precipitate was recovered by filtration and dried in a vacuum. 9.8 g of a polymer was obtained. This polymer did not contain any component insoluble in cyclohexane, which means that the polymer is a complete graft copolymer.

EXAMPLE 5

Radical Copolymerization of Styrylated Propylene Polymer with Methyl Methacrylate The same polymerization procedure as that of the Example 4 was repeated except that methyl methacrylate was used as the vinyl compound and that a mixture comprising 100 ml of toluene and 100 ml of tetrahydrofuran was used as the solvent. 9.7 g of a polymer was obtained. This polymer did not contain any component insoluble in cyclohexane, which means that the polymer is a complete graft copolymer.

EXAMPLE 6

Radical Copolymerization of Styrylated Propylene Polymer with Glycidyl Methacrylate A similar polymerization procedure to that of the Example 4 was repeated except that 2.0 g of glycidyl methacrylate was used as the vinyl compound and that a mixture comprising 100 ml of toluene and 100 ml of tetrahydrofuran was used as the solvent. 6.7 g of a polymer was obtained. This polymer did not contain any component insoluble in cyclohexane, which means that the polymer is a complete graft copolymer.

EXAMPLE 9

Radical Copolymerization of Styrylated Propylene Polymer with 2-Hydroxyethyl Methacrylate A similar polymerization procedure to that of the Example 4 was repeated except that 10.0 g of the styrylated propylene polymer was used, that 4.0 g of 2-hydroxyethyl methacrylate was used as the vinyl compound and that a mixture comprising 100 ml of toluene and 100 ml of tetrahydrofuran was used as the solvent. 9.4 g of a polymer was obtained. This polymer was soluble in methanol and did not contain any component insoluble in cyclohexane, which means that the polymer is a complete graft copolymer.

EXAMPLE 8

Anionic Copolymerization of Styrylated Propylene Polymer with Methyl Methacrylate 200 ml of dry toluene as a solvent, 5 g of the styrylated propylene polymer prepared in the Example 1 and 5 g of methyl methacrylate as a vinyl compound were fed into a 500-ml three-necked separable flask fitted with a balloon and a three-way cock in a nitrogen atmosphere. The contents were stirred with a magnetic stirrer at $-78°$ C. in the presence of 1 ml of BuLi (0.1 mol/l hexane solution) as an initiator for 3 hours to conduct polymerization.

After the completion of the reaction, the reaction mixture was poured into excess methanol to form a precipitate. This precipitate was subjected twice to reprecipitation procedure comprising dissolving it in toluene and dropping the obtained solution into methanol to form a precipitate again. The resulting precipitate was recovered by filtration and dried in a vacuum. 9.5 g of a polymer was obtained. That the obtained polymer was a graft copolymer was ascertained based on solubility difference.

EXAMPLE 9

Cationic Copolymerization of Styrylated Propylene Polymer with P-methoxystyrene 200 ml of dry ethylene chloride, 5 g of the styrylated propylene polymer prepared in the Example 1 and 5 g of p-methoxystyrene as a vinyl compound were fed into a 500-ml three-necked separable flask fitted with a balloon and a three-way cock in a nitrogen atmosphere. The contents were stirred with a magnetic stirrer in the presence of 1 ml of iodine and 1 ml of hydrogen iodide as initiators at 30° C. for 5 hours to conduct polymerization.

After the completion of the reaction, the reaction mixture was poured into excess methanol to form a precipitate. This precipitate was subjected twice to reprecipitation procedure comprising dissolving it in toluene and dropping the obtained solution into methanol to form a precipitate again. The resulting precipitate was recovered by filtration and dried in a vacuum. 7.8 g of a polymer was obtained. That the obtained polymer was a graft copolymer was ascertained based on solubility difference.

We claim:

1. A process for the preparation of a propylene (co)polymer having a polymerizable group represented by the following general formula

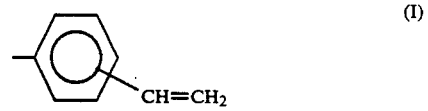

at one terminal thereof, comprising the steps of:
   (a) (co)polymerizing propylene in the presence of polymerization catalysts comprising a catalyst component (x) containing a vanadium compound represented by the general formula (III):

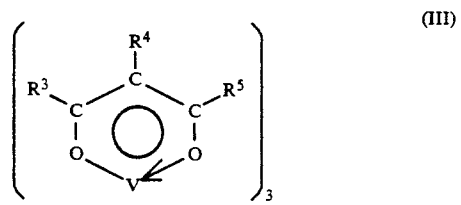

wherein $R^3$ to $R^5$ each represents a hydrogen atom or a hydrocarbyl group having 1 to 8 carbon atoms, except a case wherein the three groups are simultaneously hydrogen atoms, and an organometallic compound (y) having a metal of a Group I, II or III of the periodic table to form a propylene (co)polymer having a reactive terminal;
   (b) reacting the propylene (co)polymer having a reactive terminal of step (a) with an aromatic divinyl compound represented by the following general formula (IV):

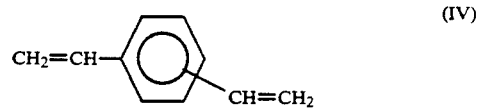

wherein the relative position of the two substituents on the benzene ring may be any of the o-, m- and p-positions; and (c) reacting the resulting propylene (co)polymer of step (b) with a proton donor or a halogen molecule.

2. The process as claimed in claim 1, wherein the vanadium compound is selected from the group consisting of the following compounds A, B and C

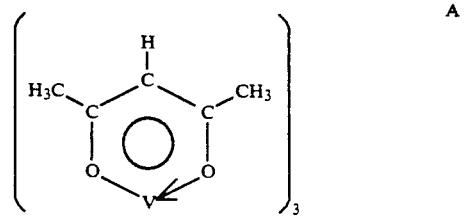

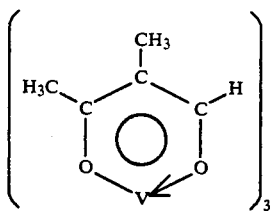

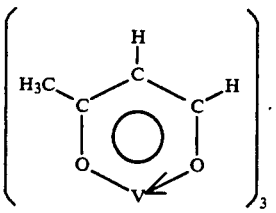

3. The process as claimed in claim 1, wherein the organometallic compound (y) is an organoaluminium compound.

4. The process as claimed in claim 1, wherein steps (a) and (b) are conducted in a solvent which is inert to the polymerization reaction and in a liquid form during the polymerization reaction.

5. The process as claimed in claim 1, wherein step (a) is conducted in the presence of a reaction accelerator.

6. The process as claimed in claim 1, wherein the proton donor is selected from the group consisting of an alcohol and a mineral acid.

7. A graft copolymer comprising a main chain originated from a vinyl compound and a side chain originated from a propylene (co)polymer having a polymerizable group of the formula

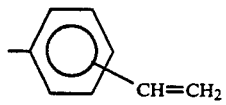 (I)

at one terminal thereof.

8. The graft copolymer as claimed in claim 7, wherein the side chain comprises a chemical constitution represented by the following general formula (V):

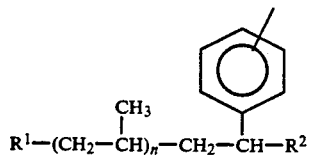 (V)

wherein

R$^1$ represents a hydrogen atom or a hydrocarbyl group having 1 to 3 carbon atom(s);

R$^2$ represents a hydrogen atom or a halogen atom; n is 10 to 10,000; and the relative position of the substituents on the benzene ring may be any of the o-, m- and p-positions.

9. The process for the preparation of the graft copolymer as claimed in claim 7 comprising a step of copolymerizing said propylene (co)polymer with a vinyl compound copolymerizable therewith.

10. The process for the preparation of the graft copolymer as claimed in claim 8 comprising a step of copolymerizing said propylene (co)polymer having the formula

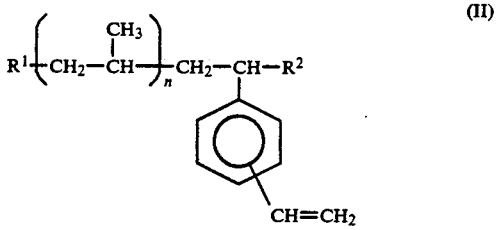 (II)

wherein

R$^1$ represents a hydrogen atom or a hydrocarbyl group having 1 to 3 carbon atom(s);

R$^2$ represents a hydrogen atom or a halogen atom;

n is 10 to 10,000; and the relative position of the —CH=CH$_2$ substituent on the benzene ring may be any of the o-, m- and p-positions with a vinyl compound copolymerizable therewith.

11. The process as claimed in claim 9 or 10, wherein the the step of copolymerizing is conducted by means of radical copolymerization method, anionic copolymerization method or cationic copolymerization method.

12. The process as claimed in claim 3, wherein the organometallic compound (y) is an organoaluminum compound represented by the general formula R$_2$AlX wherein R represents an alkyl group or an aryl group having 1 to 8 carbon atoms and X represents the halogen atom.

13. The process as claimed in claim 3, wherein the organometallic compound (y) is selected from the group consisting of dimethylaluminum chloride, diethylaluminum chloride, diethylaluminum bromide and diisobutylaluminum chloride.

14. The graft copolymer as claimed in claim 7, wherein the vinyl compound is selected from the group consisting of styrene, methyl methacrylate, glycidyl methacrylate, 2-hydroxyethyl methacrylate and p-methoxystyrene.

15. The process according to claim 1 wherein when step (a) is a co-polymerization step, co-polymerization of propylene is conducted is the presence of an alpha-olefin other than propylene.

16. The process as claimed in claim 15 wherein said alpha-olefin is selected from ethylene, 1-butene, 1-hexene and 4-methyl-1-pentene.

* * * * *